United States Patent [19]

Bugante

[11] 3,997,320

[45] Dec. 14, 1976

[54] PROCESS OF PROMOTING THE FLOWERING OF MANGO TREES AND COMPOSITIONS USED THEREFOR

[75] Inventor: Restituto L. Bugante, Laguna, Philippines

[73] Assignee: Alfonso G. Puyat, Makati, Philippines

[22] Filed: Sept. 24, 1975

[21] Appl. No.: 616,355

[30] Foreign Application Priority Data

Dec. 24, 1974 Philippines .............................. 8714

[52] U.S. Cl. ......................................... 71/63; 71/1; 71/31; 71/32; 71/54; 71/61

[51] Int. Cl.² ......................................... C05D 3/02

[58] Field of Search .......... 71/34, 47, 53, 63, 64 C, 71/1, 31, 32, 54, 61; 423/430

[56] References Cited

UNITED STATES PATENTS

| | | | |
|---|---|---|---|
| 1,320,701 | 11/1919 | Manns | 71/63 |
| 1,875,281 | 8/1932 | von Sigmond | 71/63 |
| 2,061,534 | 11/1936 | Balz et al. | 71/63 X |
| 2,770,538 | 11/1956 | Vierling | 71/53 X |
| 3,660,069 | 5/1972 | Backlund | 71/53 X |

*Primary Examiner*—Charles N. Hart
*Assistant Examiner*—Ferris H. Lander

[57] ABSTRACT

This invention relates to a composition for promoting the flowering of mango trees which comprises:
  A. from about 7 to 15% by weight of a salt of calcium selected from the group consisting of $Ca(OH)_2$ and $CaCO_3$
  B. from about 0.06 to 0.08% by weight of KOH
  C. from about 0.05 to 0.07% by weight of $H_3PO_4$
  D. from about 15.00 to 25% by weight $HNO_3$
  E. from about 0.005 to 0.0007% by weight $NH_4OH$
  F. from about 0.001 to 0.006% by weight of $MnSO_4$
  G. from about 0.006 to 0.10% by weight of $FeSO_4$
  H. from about 0.00002 to 0.003% by weight of $ZnSO_4$
  I. from about 0.15 to 0.35% by weight of $MgSO_4$
  J. balance water.

4 Claims, No Drawings

PROCESS OF PROMOTING THE FLOWERING OF MANGO TREES AND COMPOSITIONS USED THEREFOR

BACKGROUND OF THE INVENTION

This invention relates to the process of promoting the flowering of fruit-bearing plants and trees by applying a novel composition.

More specifically, the invention relates to a mango flower induction treatment.

Control of flowering in fruit-bearing plants and trees is of much importance in order to produce out a season crop, improve fruiting at a minimum cost. Discovery of such method of control is of great importance in view of the economic importance of these fruits.

A conventional method of inducing flowering of fruit-bearing plants and trees, e.g., mango, lanzones, santol, etc., is by smudging which has a sole purpose, to repel the insects that might retard the development of flower buds.

Mango trees with well-matured leaves and well-formed terminal dormant buds are smudged for a period of at least 14 days thereby producing early flowering of mango trees. The system is, however, ineffective unless great heat and for a sustained period is achieved. The probability of success is low when constant drizzling coincides with the smudging. Further, the cost of smudging is too high on a per tree basis and further it has been proven that the effective number of trees an individual can smudge effectively is seven mango trees. Thus, smudging on an orchardwide basis is very difficult. The present invention does away with all these uncertainties and management difficulties.

In Philippine Pat. No. 1178 by Robert W. Leeper and Victor C. Fusco, there is disclosed a method of promoting flowering in vegetative pineapple plants by applying an aqueous solution of beta-hydroxyethyl-N-beta-hydroxyethyl-carbazinate.

In Philippine Pat. No. 7606 by Ramon Barba, there is also disclosed a process by promoting flowering of vegetative mango and pineapple plants by applying an aqueous solution of a compound selected from the group consisting of thiourea, calcium nitrate, ammonium nitrate and mixtures thereof in the leaves of mango plants and in the heart of the pineapple plants.

The primary object of the present invention is to provide a method of promoting flowering in fruit-bearing plants and trees.

Further, it is an object of the present invention to provide a method of promoting flowering of mango plants with well-matured leaves and well-formed terminal dormant buds at the time of spraying.

Still further, it is an object of the present invention to provide a novel composition comprising of two-phase equilibrium system which when sprayed to mango trees induces flowering.

These objects as well as other objects of this invention will become readily apparent after reading the following description as hereinafter described.

DETAILED DESCRIPTION OF THE INVENTION

According to the present invention, mango trees with well-matured leaves and well-formed terminal dormant buds develop flower flushes from anywhere between 9 to 14 days after one foliar application. The system of application is through power sprayers which finish the job in 3 to 5 minutes depending on the size of the tree. In combination with any foliar sticker, the application can proceed even in the presence of a constant drizzle.

The composition of the present invention is a two-phase equilibrium system composed of the following components:

Component A - about 7–15% by weight of a salt of calcium selected from the group consisting of calcium hydroxide and calcium carbonate.

Component B - about 0.06 – 0.8% by weight of potassium hydroxide.

Cpomponent C - about 0.05– 0.07% by weight of phosphoric acid (concentrated).

Component D - about 15.00 – 25.00% by weight of nitric acid (concentrated).

Component E - about 0.0005 – 0.0007% by weight of ammonium hydroxide (concentrated).

Component F - about 0.001 – 0.006% by weight of manganese sulfate.

Component G - about 0.006   0.10% by weight of ferrous sulfate.

Component H - about 0.00002 – 0.003% by weight of zinc sulfate.

Component I - about 0.15 – 0.35% by weight of magnesium sulfate.

Component J - balance from 100% is water.

pH of the composition of the present invention lies in the range of between 4.0 – 10.0.

The components of the present composition include the basic specifications of a complete foliar fertilizer, e.g., nitrogen, potassium, phosphorus, thereby ensuring no nutritional deficiency that will befall the tree in spite of the anticipated heavy fruiting.

Further, this system of flower induction treatment is an acidity-alkalinity adjuster of the leaves of the plants and trees. The composition is so formulated to establish a pH range of between 5.6 – 7 in the leaves of plants and trees. pH level at this range will ensure firm fruits which are required by foreign buyers.

The amount effective to promote flowering is 1 part of the composition to 20 – 40 parts water depending on the average temperature. The hotter the temperature is, the more the dilution.

The following examples will further illustrate the present invention.

EXAMPLE I

The present composition is prepared by mixing thoroughly 10–30 kg. of the salt of calcium with 60 liters of water. 10 – 15 liters of nitric acid is added until the mixture becomes slightly acidic. To the resultant mixture is added 500 ml of a mixture of 1 kilogram potassium hydroxide and 500 –1500 milliliter phosphoric acid in 20 liters water. Then finally 100 – 300 milliliter ammonium hydroxide is added to make the pH of the solution slightly alkaline.

The other components are then finally added. One liter of this solution is diluted to 20 –47 liters for spraying purposes.

EXAMPLE II

Chemical analysis of the equilibrium system produced in Example I when diluted to 20 –40 liters to make a final spray composition:

| | % (w/w) |
|---|---|
| $CaCO_3$ or $Ca(OH)_2$ | 0.35 – 0.75 |

-continued

| | % (w/w) |
|---|---|
| Potassium hydroxide | 0.003 – 0.004 |
| Phosphoric acid | 0.0025 – 0.0035 |
| Nitric acid | 0.60 – 1.0 |
| Ammonium hydroxide | 0.000025 – 0.000035 |
| Manganese | 0.00002 – 0.0001 |
| Iron | 0.001 – .00015 |
| Zinc | 0.0000005 – 0.0000045 |
| Magnesium | 0.0020 – 0.0035 |
| pH | 4 – 10.0 |

EXAMPLE III

In commercial test, 2,900 mango trees were made to flower by 15 men by spraying the trees with the final spray mixture having the above compositions. The conventional smudging would have required 415 men working for 14 days to do the same thing.

Having thus described and illustrated the invention what is claimed is:

The invention claimed is:

1. A composition for promoting the flowering of mango trees which comprises:
   A. from about 7 to 15% by weight of a salt of calcium selected from the group consisting of calcium hydroxide and calcium carbonate;
   B. from about 0.06 to 0.08% by weight potassium hydroxide;
   C. from about 0.05 to 0.07% by weight phosphoric acid;
   D. from about 15.00 to 25.00% by weight nitric acid;
   E. from about 0.0005 – 0.0007% by weight ammonium hydroxide;
   F. from about 0.001 –0.006% by weight manganese sulfate;
   G. from about 0.006 –0.10% by weight ferrous sulfate;
   H. from about 0.00002 to 0.003% by weight zinc sulfate;
   I. from about 0.15 to 0.35% by weight magnesium sulfate;
   J. balance water.

2. A method of promoting the flowering of matured mango trees which comprises applying to the leaves and terminal dormant buds an effective amount of the composition according to claim 1.

3. A method according to claim 2 wherein the active composition is diluted to 1 part of the composition to 20 – 40 parts water.

4. A method according to claim 3 wherein application is done through power sprayers to the trees with well-matured leaves and well-formed terminal dormant buds.

* * * * *